Jan. 2, 1934.     H. M. GRAY     1,942,057
DEVICE FOR HEATING WINDSHIELDS OR THE LIKE
Filed July 30, 1931     2 Sheets-Sheet 1
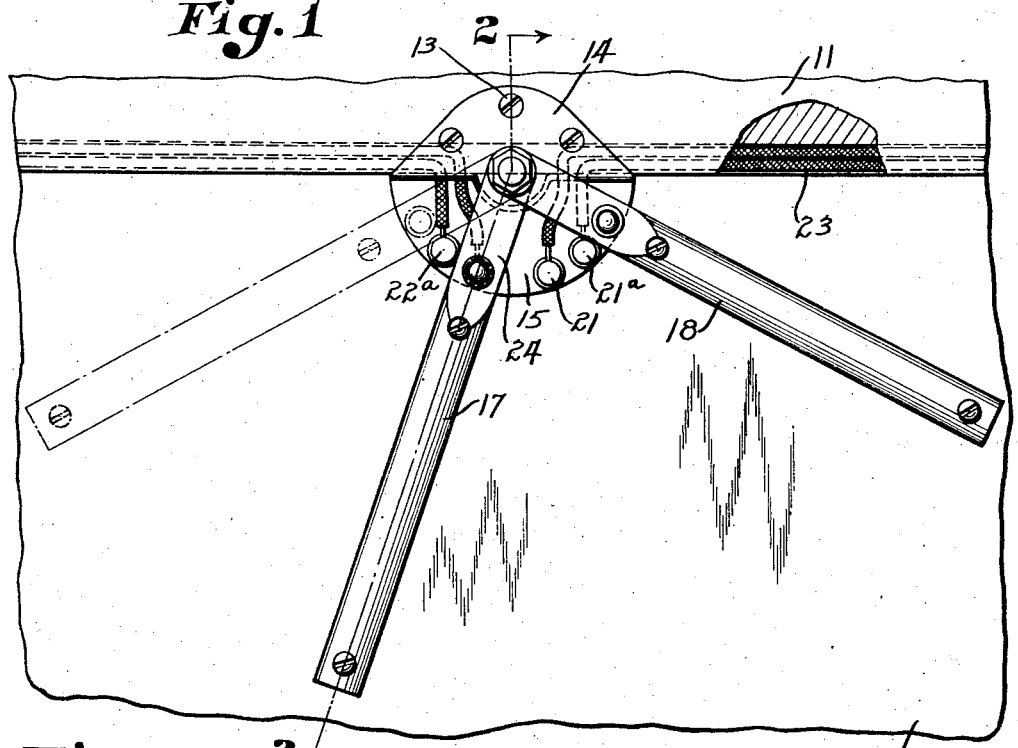
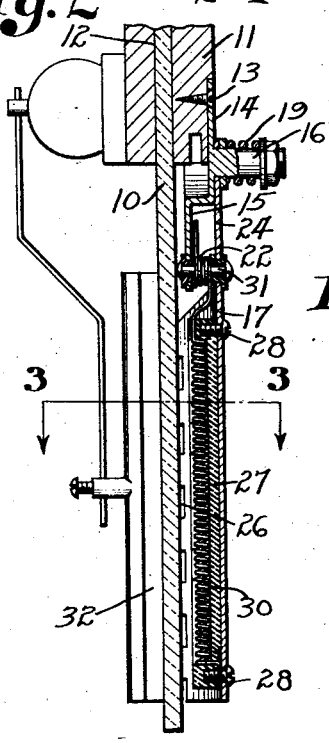
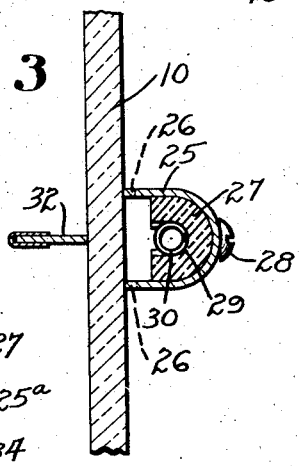
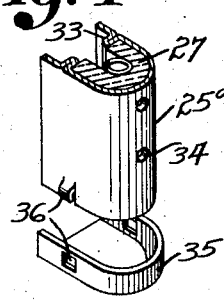
Inventor
Hubert M. Gray
By Owen & Owen
Attorneys

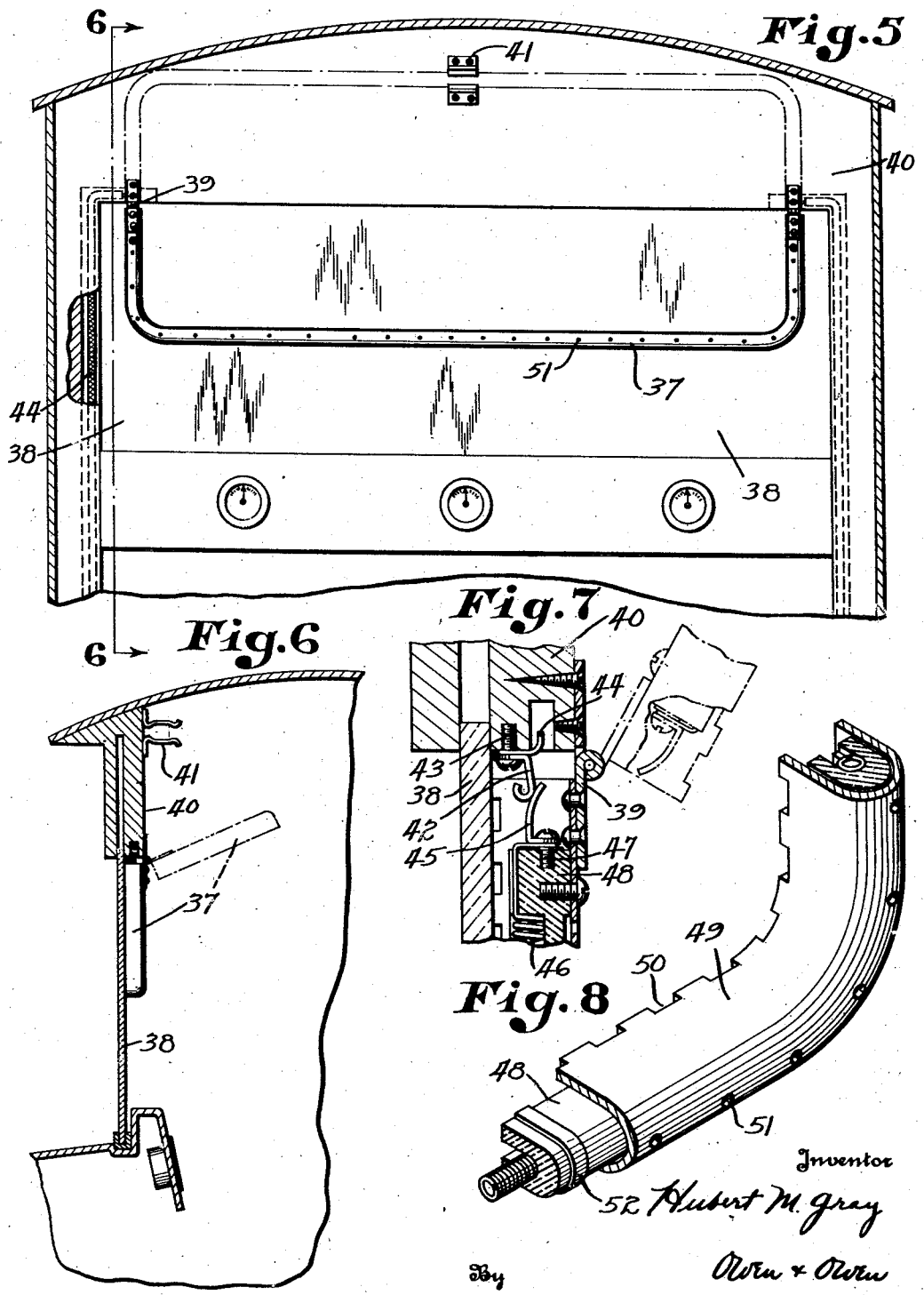

Patented Jan. 2, 1934

1,942,057

UNITED STATES PATENT OFFICE 1,942,057

DEVICE FOR HEATING WINDSHIELDS OR THE LIKE

Hubert M. Gray, Toledo, Ohio

Application July 30, 1931. Serial No. 554,096

1 Claim. (Cl. 219—19)

This invention relates to devices for preventing the gathering or accumulation of snow, sleet, or ice, on windshields or windows of automobiles, airplanes, railway cars, and the like, and an object is to produce a simple and efficient device of this character having the new and improved features of construction, arrangement and operation hereinafter described.

For purposes of illustration embodiments of the invention are shown on the accompanying drawings, in which:

Fig. 1 is a side elevation of a windshield heating device applied to a windshield of an automobile;

Fig. 2 is a vertical sectional elevation on the line 2—2 of Fig. 1 showing a heating element in section, and the relation between the heating device and the usual windshield wiper;

Fig. 3 is a transverse sectional view on the line 3—3 of Fig. 2;

Fig. 4 is a perspective view partly in section of an alternate form in which the heating element is detachable from the casing, and a cap is provided closing the outer end of the casing;

Fig. 5 is a vertical sectional elevation of the inside of an automobile, such as a truck, showing another form of windshield heating device, the latter being shown in full lines in position of use;

Fig. 6 is a vertical sectional elevation on the line 6—6 of Fig. 5;

Fig. 7 is an enlarged sectional view of the mounting for the heating device shown in Figs. 5 and 6 showing particularly the automatic switch construction; and Fig. 8 is an enlarged perspective view of a portion of the heating element showing the manner in which the heating unit is connected to the casing.

The illustrated embodiment of the invention shown in Figs. 1 to 3 comprises a windshield 10, along the upper portion of which is a horizontal bracing member 11 having a vertical slot 19 in which the windshield is movable. Secured to the rear face of the brace 11 by screws 13 is a metal bracket 14, which depends from the brace 11. The depending portion 15 of the bracket 14 extends within the plane of the brace 11, and is arcuately shaped. Projecting outwardly from the bracket 14 at substantially right angles thereto is a post 16 on which are pivotally mounted arms 17 and 18. A coil spring 19 encircling the post 16 and abutting against a nut 20 exerts friction against the pivotal connections of the arms 17 and 18 to hold them in their adjusted position.

Mounted on the depending portion 15 of the bracket are contacts 21, 21ª and 22, 22ª, which are insulated from the mounting plate in any suitable manner. Extending to the various contacts 21, 21ª and 22, 22ª are leads 23, which may be joined at their opposite ends either to the storage battery of the automobile or the generator, preferably the generator.

The arms 17 and 18 are similarly constructed, and each consists of a flattened portion 24, which is pivoted to the post 19 at one end, and the opposite end merges into a substantially U-shaped portion 25 with the open end of the U adapted to contact with the windshield 10. As shown in Fig. 2, the edges of the U-shaped casing 25 are fluted or provided with a series of notches 26 to enable the heat generated within the casing to pass through the openings for heating adjacent portions of the windshield.

Within the U-shaped casing 25 is a block 27 of suitable insulating material which is held in place by scerws 28. On the inner side of the block 27 facing the windshield 10 is an elongate groove 29 to receive an electric heating coil 30, one end of which is attached to the screw 28 on the outer end of the casing 25, and the opposite end engages a contact pin 31 which is on the flattened portion 24 from which it is suitably insulated.

From the above description it is manifest that the arms 17 and 18 may be swung in either direction, and when the contact 31 engages either of the respective contacts on the bracket plate 15, the heating coil 30 will be energized, a greater amount of heat being generated when the contact 21 or 22 is engaged than the contacts 21ª and 22ª. The heat generated by the respective arms will quickly heat the adjacent surfaces of the windshield sufficiently to prevent the gathering or formation of frost or ice on the outer surface of the windshield, and thereby permit a wiper 32, which may be of any well known construction, to operate efficiently on the outer side of the windshield. The driver will position the arms 17 and 18 in accordance with the weather or temperature conditions. If the temperature is extremely low the arms 17 and 18 will be moved to engage the contacts 22 and 21 respectively, in order to generate more heat, but under less severe conditions the contacts 21ª and 22ª will be engaged. By arranging the arms at the angles shown, a substantial portion of the windshield will be heated to afford clearer vision to the driver, particularly with the aid of the wiper 32 operated on the outside of the windshield. When the use of the windshield heating devices is not necessary, they may be swung upward into the dot and dash position shown in Fig. 1, in which the electrical connections are broken. The arms will be retained in such elevated position due to the friction created at the pivot points by the spring 19.

In the alternate form shown in Fig. 4, the casing 25ª is provided with inwardly extending beads 33 to retain the insulating block or electrical heating unit 27 against lateral movement in one direction. If desired, perforations 34 may be formed in the casing 25ª to permit the escape of heat from the insulating block, and to assist in preventing excessive heating of the casing. A flanged cap 35 may be provided to close the outer end of the casing 25ª to prevent longitudinal movement of the block 27, suitable fastening means 36 being provided to retain the cap in place.

The form shown in Figs. 5 to 8, is particularly useful in connection with trucks, or where it is desired to keep a larger area of the windshield free from frost, ice and sleet. As shown, the heating device 37 is of U-shape, and is adapted to swing downwardly into contact with a windshield 38. The upper ends of the heating unit 37 are connected by hinges 39 to a horizontal portion 40 of the truck body disposed above the windshield. Normally, the device is held in elevated position by a pair of spring clamping members 41 between which the heating device may be readily inserted.

A switch is provided so that when the heating device 37 is dropped downwardly into position of use the switch is automatically thrown on to energize the heating element. For this purpose a spring contact plate 42 is secured by a screw 43 to the horizontal body portion 40 adjacent each of the ends of the heating device. A lead 44 is clamped in place by the screw 43 for delivering current from the storage battery or generator to the contact plate 42. A spring contact plate 45 electrically connected to the heating coil 46 is secured by screw 47 to an insulating block 48. The plates 42 and 45 are so arranged that when the heating device 37 is swung downwardly the plates are moved into engagement, but when the heating device is swung upwardly the plates are separated.

Partially enclosing the insulating block 48 is a U-shaped casing 49 having slots 50 in the edges thereof similar to that above described. The casing 49 is provided with a plurality of air vents 51, and, in this instance the insulating block 48 is provided with a series of ribs 52 to space the block from the casing, and thereby prevent liability of the casing becoming overheated. If desired, similar ribs or enlargements may be formed on the insulating blocks shown in Figs. 1 to 4.

From the above description it will be apparent that I have provided a simple and efficient device for heating the inside of a windshield, and thereby effectively prevent the gathering of ice or sleet, which would otherwise interfere with the driver's vision. It is to be understood, however, that the invention is not limited to the use of this device in connection with automobiles, but can be used to advantage in railway cars, airplanes, or any other place, in which it is desired to keep a window free from icy accumulations. The device can be cheaply manufactured, and there are practically no parts to break or become inoperative with the possible exception of the heating unit, which can readily be replaced. It is also to be understood that other heating elements may be provided to accomplish the same purpose, as for example, water or other liquid suitably heated, or gas from the engine exhaust.

It is further to be understood that numerous changes in details of construction, arrangement and operation may be effected without departing from the spirit of the invention.

What I claim as new and desire to secure by Letters Patent is:

In a device for heating windshields or the like, an arm adapted to substantially contact a windshield, a bracket for said arm, a pair of contacts on said bracket engageable selectively by said arm, and an electrical heating unit on said arm adapted to be energized by one or the other contact in accordance with the position of said arm.

HUBERT M. GRAY.